United States Patent [19]

Negele et al.

[11] 4,438,989

[45] Mar. 27, 1984

[54] BALL BEARING

[75] Inventors: Richard Negele, Esslingen; Wilhelm Birkenmaier, Weinstadt, both of Fed. Rep. of Germany

[73] Assignee: SKF Kugellagerfabriken GmbH, Schweinfurt, Fed. Rep. of Germany

[21] Appl. No.: 45,648

[22] Filed: Jun. 5, 1979

[30] Foreign Application Priority Data

Jun. 6, 1978 [DE] Fed. Rep. of Germany ... 7816941[U]

[51] Int. Cl.³ .................... F16C 19/16; F16C 27/04; F16C 33/78
[52] U.S. Cl. .................... 308/184 R; 308/187.2; 308/193
[58] Field of Search ........... 308/184 R, 187.2, 188, 308/193, 194, 195, 196

[56] References Cited

U.S. PATENT DOCUMENTS

| 1,546,363 | 7/1925 | Beemer | 308/196 |
| 3,351,398 | 11/1967 | Park et al. | 308/189 R |
| 3,801,171 | 4/1974 | Rozentals | 308/184 R |
| 4,017,128 | 4/1977 | Setele et al. | 308/184 R |
| 4,033,643 | 7/1977 | Miller et al. | 308/187.2 |

FOREIGN PATENT DOCUMENTS 803340 10/1958 United Kingdom .......... 308/184 R

*Primary Examiner*—Richard R. Stearns
*Attorney, Agent, or Firm*—Daniel M. Rosen

[57] ABSTRACT

A ball bearing has inner and outer raceways, and a row of balls mounted to roll between said raceways. The outer raceway is defined by an outer ring axially held in position by flanges of an outer sleeve. An axially extending space is provided between the outer ring and one of the flanges of the outer sleeve, for receiving a bearing element determined by the use in which the bearing will be placed. Examples of the bearing function-defining element are an annular seal, a corrugated annular spring, and the combination of a corrugated annular spring and a rigid washer.

10 Claims, 4 Drawing Figures

BALL BEARING

BACKGROUND OF THE INVENTION

The invention relates to a ball bearing with sealing means and/or play-free positioning, preferably comprising an inner bearing ring or a shaft provided with raceways, an outer ring, and balls rolling between the bearing rings or between the shaft and the outer ring, respectively. The ball bearing also includes an outer sleeve which serves as a housing for the outer ring. The bearing must be suited for both low and high speeds, and is adapted to be used in applications where misalignment, shock loads or the like may occur.

In a prior-art design of a ball bearing, adapted for haulage-wheels and other bearings where great precision is not required and which may even be exposed to considerable fouling, the outer ring is in the form of a substantially cuplike hemispherical shell. This known cuplike hemispherical shell forms an inner space, in combination with a separate side ring, punched out of sheet metal, and a solid inner ring. A track is provided in this interior space, for receiving the rolling elements. The parts forming the outer ring of the bearing are held together by a sheet-metal cap having a steplike chamber into which a sealing ring is set. This ball bearing, which is used in less critical applications, is unsuited for use with electrical machinery such as motors or generators, in which noise or other vibrations are undesired. Also it cannot be relied upon to function properly for a prolonged period.

In a known design of a play-free ball bearing, a positioning ring is disposed between a ring which abuts on a ball guide ring and a retaining ring that is held in a groove in the bore of the outer bearing ring. This positioning ring urges the ball guide ring and the rolling elements against a fixed shoulder on the inner ring. In this arrangement, the positioning requires the use of many separately fabricated parts and thus represents a costly unit. No provision is incorporated for sealing the bearing.

The present invention is therefore directed to the provision of a ball bearing which can be produced inexpensively, yet may be used as a precision bearing, it being possible to convert it in a simple manner, merely by replacing one of the parts. The bearing thus comprises a basic unit which can be adapted readily to make a sealed or unsealed axially locating bearing, an axially preloaded bearing or a sealed and axially preloaded bearing.

The ball bearing in accordance with the invention is thus useful, for example, as a bearing for the rotor shaft of electrical machinery, such as a vacuum-cleaner motor, with the locating bearing constituting a complete bearing unit, and the non-locating bearing on the commutator side also being set into the bearing bracket as a complete, axially adjusted or preloaded bearing unit. In an electric motor equipped with the bearing in accordance with the invention, low-noise operation may be achieved by providing for axial adjustment or preloading of both rotor bearings by means of the mounting screws of the bearing brackets, the outer sleeves of both bearings being set into the bearing brackets with a firm fit. Axial displaceability of the rotor-shaft bearing is obtained at the outer ring of the axially non-locating bearing, which is set into the outer sleeve so as to be axially displaceable, and by the use of an axially preloaded adjusting spring. Jamming of the antifriction bearings is thereby precluded.

BRIEF DESCRIPTION OF THE DRAWINGS

In order that the invention will be more clearly understood, it will now be disclosed in greater detail with reference to the accompanying drawings, wherein.

DETAILED DESCRIPTION OF THE DRAWINGS

Figure 1:
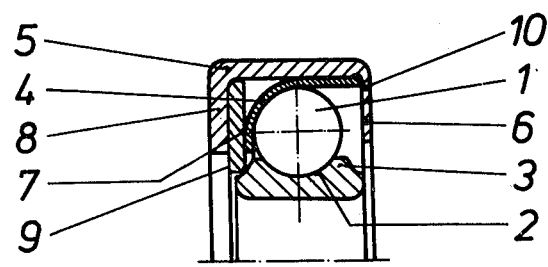
FIG. 1 is a partial cross-section through a bearing having a seal, in accordance with the invention.

Like parts are designated by like reference numerals in the different figures.

FIG. 1 shows an embodiment of a solid-ball bearing of the invention in which the balls 1 roll in an inner raceway 2, machined into the solid inner ring 3. The outer ring 4 is fabricated from relatively thin steel sheet by a non-cutting forming method (i.e. wherein the forming does not involve cutting the material), such as stamping, and is set axially displaceably into the outer sleeve 5. The outer sleeve 5 is also produced by a non-cutting forming operation, and has a flange 6 bent radially inwardly for holding the unilaterally acting ball bearing together. A sealing disk 9 is inserted between the front end 7 of the outer ring 4 and the inwardly directed flange 8 of the outer sleeve 5. The thickness reduction 10 of the outer sleeve 5 in the area of the flange 6, produced by a non-cutting operation, serves to facilitate bending of the radially inwardly directed flange 6 after assembly of the bearing elements.

Figure 2:
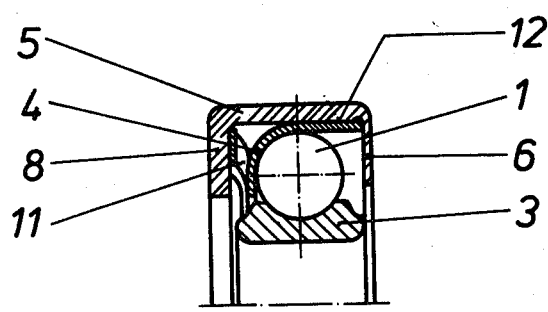
FIG. 2 is a partial cross-section through a play-free, that is to say, axially preloaded or adjusted ball bearing in accordance with the invention.
Figure 4:
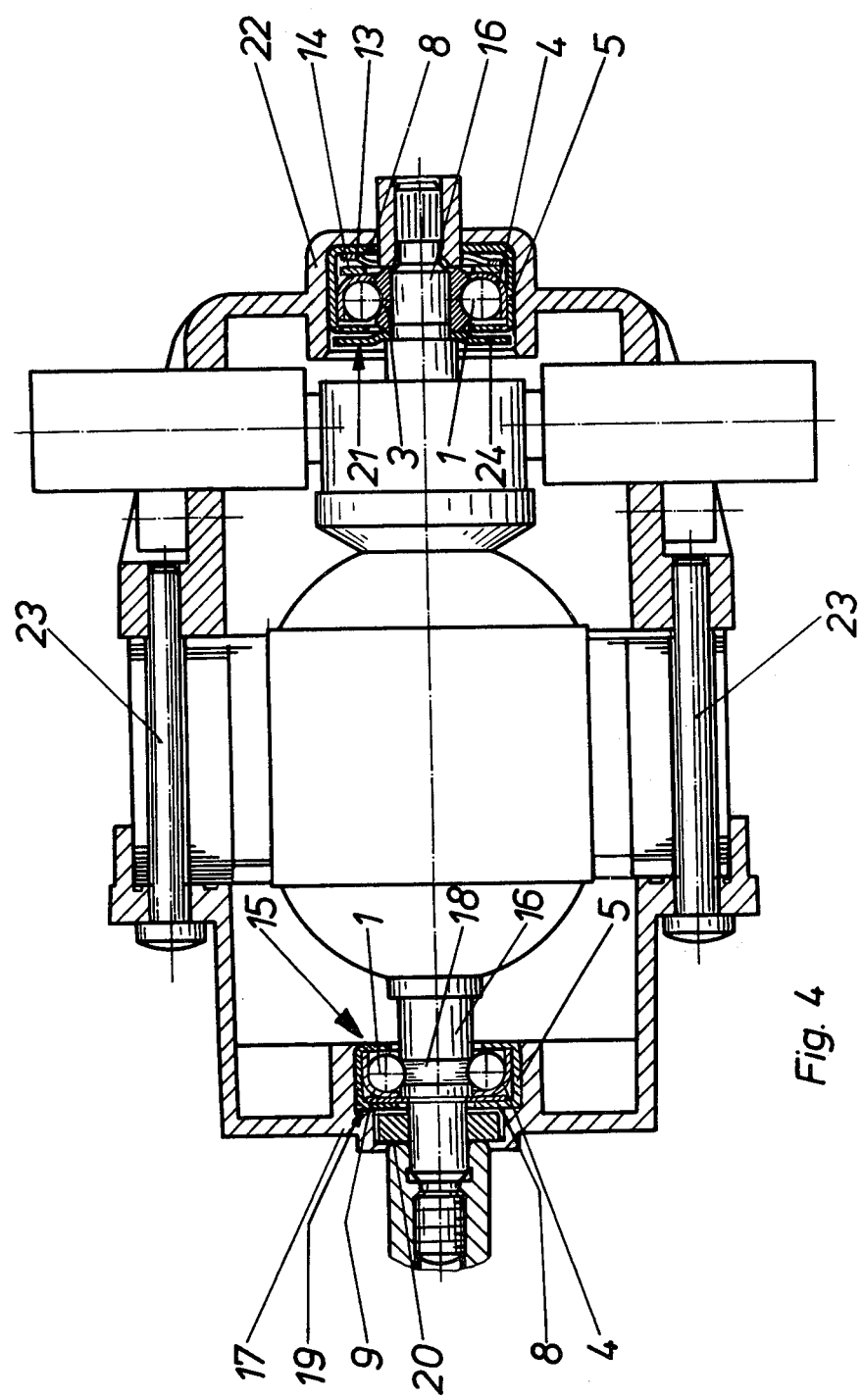
FIG. 4 is a longitudinal section through an electric motor provided with ball bearings in accordance with the invention.

FIG. 2 shows a play-free, axially adjusted solid-ball bearing. This ball bearing is substantially identical with the bearing shown in FIG. 1. Here, however, a positioning preloaded spring (spring element) 11, having characteristics and shape adapted to the particular bearing load, is provided in the space between the outer ring 4 and the radially inwardly directed flange 8 of the outer sleeve 5. The outer peripheral surface 12 of the outer ring 4 has a sliding fit in the bore of the outer sleeve 5, produced by a non-cutting forming operation. With the bearing mounted, the positioning spring 11 produces a resilient positioning of the bearing, as will be explained in greater detail when FIG. 4 is described.

Figure 3:
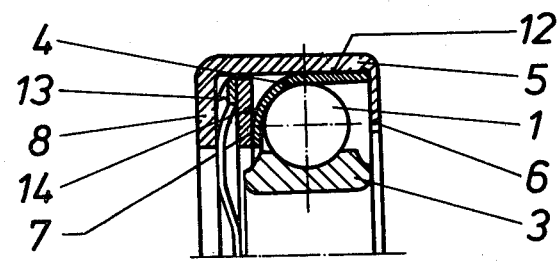
FIG. 3 is a partial cross-section through another embodiment of a play-free ball bearing.

Another embodiment of a play-free ball bearing is shown in FIG. 3. This embodiment is substantially the same as FIG. 2. As a refinement of the invention, however, the positioning spring 13, which may be a corrugated spring, for example, abuts an axially displaceable support washer, rigid washer 14, which bears on the front surface 7 of the outer ring 4.

In each of the above examples of a bearing in accordance with the invention, it is to be noted that in the preferred embodiments of the invention the outer ring 4 of sheet metal has a curved portion extending through a substantially 90° arc, engaging the balls along the arc commencing generally at a transverse bearing plane extending through the centers of the balls. This side of the generally cup-shaped bearing ring terminates a short distance, as necessary, from the inner ring or shaft. The other end of the outer ring extends generally axially, so as to permit lateral insertion of the balls when the reduced thickness flange 6 of the outer sleeve extends generally axially of the bearing (i.e., prior to completion of formation of the bearing). Thus, during assembly of the bearing, the function-defining elements to be placed in the space between the thicker flange and the outer bearing ring are first assembled, followed by insertion of the outer ring in the outer sleeve, and the loading of the balls between the raceways. The reduced thickness end of the outer sleeve is then bent radially inwardly so that it abuts the generally axially directed end of the outer bearing ring, to hold the bearing together. This structure thereby defines an angular contact bearing, i.e., the line joining the contacts between the raceways and extending through the center of the balls extends at an angle to the axis of the bearing.

The outer sleeve is thereby shaped to have a generally U-shaped cross-section or channel, for receiving and holding the outer bearing ring. The width of the channel, between the flanges, is greater than the axial width of the outer bearing ring, to provide the axially extending space for receiving the bearing function-defining element in the form of the seal of FIG. 1, the corrugated spring of FIG. 2, or the corrugated spring and rigid washer of FIG. 3. It will, of course, be apparent that the bearing of the invention is not limited to those applications wherein the flanges of a bearing sleeve are directed radially inwardly to form a channel for receiving and holding a raceway-defining ring and defining the space for the function-defining element.

FIG. 4 shows an embodiment of the bearing described above used as a bearing in the electric motor of a vacuum cleaner. In the rotor-shaft bearing for the motor, the locating bearing 15 is axially fixed to the rotor shaft 16. This locating bearing 15 is a solid-ball angular-contact ball bearing and substantially corresponds to the bearing shown in FIG. 1. The bearing 15 is firmly held in the bearing bracket 17 of the motor casing, provision being made here, however, for the balls 1 to roll in an inner raceway 18 machined directly into the rotor shaft 16. The locating bearing 15 is protected by a sealing disk 9 disposed between the outer ring 4 and the radially inwardly directed flange 8 of the outer sleeve 5. A shoulder 19 in the bearing bracket 17 serves to fix the axial position of the bearing. To effectively prevent dust from penetrating into the interior of the motor, the locating bearing 15 is further provided with a dust seal 20 set into the bore of the bearing bracket 17. In place of the raceway 18 machined into the rotor shaft 16, a separate inner ring may, of course, be provided, as shown in FIG. 1, which then would have to have a firm fit on the rotor shaft 16.

The non-locating bearing 21 disposed on the commutator side corresponds to the play-free ball bearing shown in FIG. 3. The outer sleeve 5 of this ball bearing advantageously has a firm fit in the bearing bracket 22 of the motor casing, so that the risk of wear in the bearing-bracket bore is eliminated. For the play-free positioning of the non-locating bearing 21, one side of a corrugated adjusting spring 13 abuts the radially inwardly directed flange 8 of the outer sleeve 5, and the other side abuts the axially displaceable support disk 14 bearing on the front surface 7 of the outer ring 4. The axially preloading and adjusting spring 13 urges the outer ring 4 against the balls 2, and the latter against the inner ring 3, and hence against the shaft shoulder, thus providing play-free seating. The further play-free axial adjustment of both bearings of the rotor-shaft bearing arrangement, that is to say, of the locating bearing 15 and the non-locating bearing 21, is effected by means of the mounting screws 23 of the bearing brackets 17 and 22, which also serve to eliminate misalignment. The play-free axial adjustment of the rotor-shaft bearings assures smooth running of the shaft since both ball bearings are permanently free of play. Even in cases where the bearing brackets are made of light metal or the like, positive play-free axial adjustment of the bearings is assured despite differential thermal expansion of the bearing brackets 17 and 22 of the outer sleeve, and thus under all operating conditions. Due to the use of the axially adjusting and positioning spring 13, a certain braking action is exerted on the outer ring 4, which has a sliding fit in the outer sleeve, and in this way a drifting or turning of the outer ring 4 in the outer sleeve 5 is effectively prevented by sliding friction. A centrifugal disk 24 rotating with the rotor shaft and disposed between the non-locating bearing 21 and the interior of the motor forms an effective seal.

The invention has been described in detail with reference to a few preferred embodiments. However, those skilled in the art will appreciate that it is not limited thereto but may be modified in many respects without such modifications constituting departures from the invention. Thus, in place of the sealing disk 9 according to FIG. 1 a rigid disk may be inserted to make an unsealed axially locating bearing, or an elastically resilient sealing disk may be inserted which has spring action in the axial direction, the sealing disk then serving also as an adjusting element, a sealed and axially adjustable bearing being thus provided.

All these different embodiments have one feature in common, namely, they are assembled from the same basic elements, and in essence only one part needs to be modified or used in a particular way to obtain a desired design. This reduces the production costs, since the parts of the bearing can be manufactured in fairly large production runs, and also a reduction in inventory costs for the semifinished parts since separate inventory is not required.

It is therefore intended in the following claims to cover each such variation and modification as falls within the true spirit and scope of the invention.

What is claimed is:

1. In a ball bearing having first and second radially spaced means defining inner and outer raceways respectively, and a row of balls positioned to roll between said raceways; the improvement wherein said first means comprises an outer shell having a pair of axially spaced apart radially inwardly directed flanges, an outer ring radially engaging said shell and axially confined between said flanges and defining said outer raceway, and space between one of said flanges and said ring, and an annular bearing function-defining element in said space and extending from said one flange to said ring, said bearing function-defining element comprising a ring corrugated in the peripheral direction positioned in said space and engaging said outer ring and the flange adjacent thereto, said corrugated ring forming a spring.

2. In a ball bearing having first and second radially spaced means defining inner and outer raceways respectively, and a row of balls positioned to roll between said raceways; the improvement wherein said first means comprises an outer shell having a pair of axially spaced apart radially inwardly directed flanges, an outer ring radially engaging said shell and axially confined between said flanges and defining said outer raceway, and space between one of said flanges and said ring, and an annular bearing function-defining element in said space and extending from said one flange to said ring, the other of said flanges having a reduced thickness.

3. In a ball bearing having first and second spaced apart means defining first and second raceways respectively and a row of balls positioned to roll between said raceways; the improvement wherein said first means comprises a sleeve having a central portion joining a pair of flanges extending radially therefrom in the same direction, thereby to define an annular channel with a generally U-shaped transverse cross-section, a ring positioned coaxially in said channel and held therein by said flanges, said ring radially engaging said central portion, said ring defining said first raceway on the side thereof radially away from said central portion, said ring having an axial dimension less than the axial distance between said flanges in said channel to define an annular space between said ring and one of said flanges and an annular bearing function-defining element in said space and extending from said ring to said one flange, said ring being a stamped sheet metal ring having an arcuate surface positioned to engage said balls, said flanges being directed radially inwardly from said central portion, whereby said ring comprises the outer ring of said bearing, the side of said ring toward said space being arcuate and engaging said function-defining element, the other axial end of said ring extending generally axially to abut the other flange of said sleeve, said other flange of said sleeve having a lesser thickness than said first mentioned flange.

4. In a ball bearing having first and second radially spaced means defining inner and outer raceways respectively, and a row of balls positioned to roll between said raceways; the improvement wherein said first means comprises an outer shell having a pair of axially spaced apart radially inwardly directed flanges, an outer ring radially engaging said shell and axially confined between said flanges and defining said outer raceway, and space between one of said flanges and said ring, and an annular bearing function-defining element in said space and extending from said one flange to said ring, said outer ring being arcuate and having an axially extending side abutting the other of said flanges, and a radially inwardly directed side axially abutting said element.

5. A ball bearing having inner and outer raceways, a row of balls positioned to roll between said raceways, one of said raceways comprising a ring having an arcuate cross-section, with a first axially extending side and a second side extending radially toward the other raceway, an annular shell having a central portion radially engaging said ring and having first and second side flanges axially confining said ring, and annular means extending axially between said first flange and said radially extending side of said ring.

6. The ball bearing of claim 5 wherein said first side of said ring axially abuts said second side flange.

7. The ball bearing of claim 6 wherein said annular means comprises a corrugated spring.

8. The ball bearing of claim 6 wherein said annular means comprises a rigid ring engaging said second side of said ring, and a corrugated spring extending between said rigid ring and said one flange.

9. The ball bearing of claim 6 wherein said annular means comprises a rigid ring.

10. The ball bearing of claim 6 wherein said annular means comprises a ring of elastically resilient material.

* * * * *